United States Patent [19]

Sakai et al.

[11] Patent Number: 4,736,384
[45] Date of Patent: Apr. 5, 1988

[54] ELECTRODE ADDING APPARATUS

[75] Inventors: Hideaki Sakai, Higashiosaka; Isao Oda, Fukayasugun, both of Japan

[73] Assignees: Kyoei Steel Ltd., Osaka; F. T. Industries Co., Ltd., Hiroshima, both of Japan

[21] Appl. No.: 938,210

[22] Filed: Dec. 4, 1986

[30] Foreign Application Priority Data

Dec. 23, 1985 [JP] Japan ................................ 60-196459
Oct. 30, 1986 [JP] Japan ................................ 61-165718

[51] Int. Cl.⁴ .............................................. H05B 7/14
[52] U.S. Cl. ...................................................... 373/92
[58] Field of Search .................................... 373/92, 91

[56] References Cited

U.S. PATENT DOCUMENTS

| | | | |
|---|---|---|---|
| 3,796,818 | 3/1974 | Yuasa et al. | 373/92 |
| 3,937,867 | 2/1976 | Wynne | 373/92 |
| 4,044,199 | 8/1977 | Simon | 373/92 |
| 4,185,158 | 1/1980 | Koga et al. | 373/92 |

Primary Examiner—Roy N. Envall, Jr.
Attorney, Agent, or Firm—Cullen, Sloman, Cantor, Grauer, Scott & Rutherford

[57] ABSTRACT

An electrode adding apparatus which adds a new electrode to an electrode held by the electrode holder of an electric furnace by screwing the lower end of the new electrode in the upper end of the electrode held by the electrode holder, when the electrode held by the electrode holder is consumed. In adding the new electrode to the consumed electrode, the new electrode is gripped by a clamping device rotatably held by a casing, then the casing is transported by a crane to bring the new electrode directly above the consumed electrode, and following which the casing is lowered to position the new electrode in alignment with the consumed electrode. Then, the clamping device is driven for rotation to screw the lower end of the new electrode in the upper end of the consumed electrode. In adding the new electrode to the consumed electrode, the rotative reaction force of the casing is received by the electrode holder so that the casing is restrained from rotation.

3 Claims, 9 Drawing Sheets

ELECTRODE ADDING APPARATUS

BACKGROUND OF THE INVENTION

1. Field of the Invention

The present invention relates to an electrode adding apparatus for an electric furnace and, more specifically, to an electrode adding apparatus for joining a new electrode to an electrode held by the electrode holder of an electric furnace by screwing the new electrode into the electrode held by the electrode holder.

2. Description of the Prior Art

Few satisfactory electrode adding apparatus for electric furnaces have been available, and adding an electrode for such a furnace has required human intervention.

Figures 8, 13:
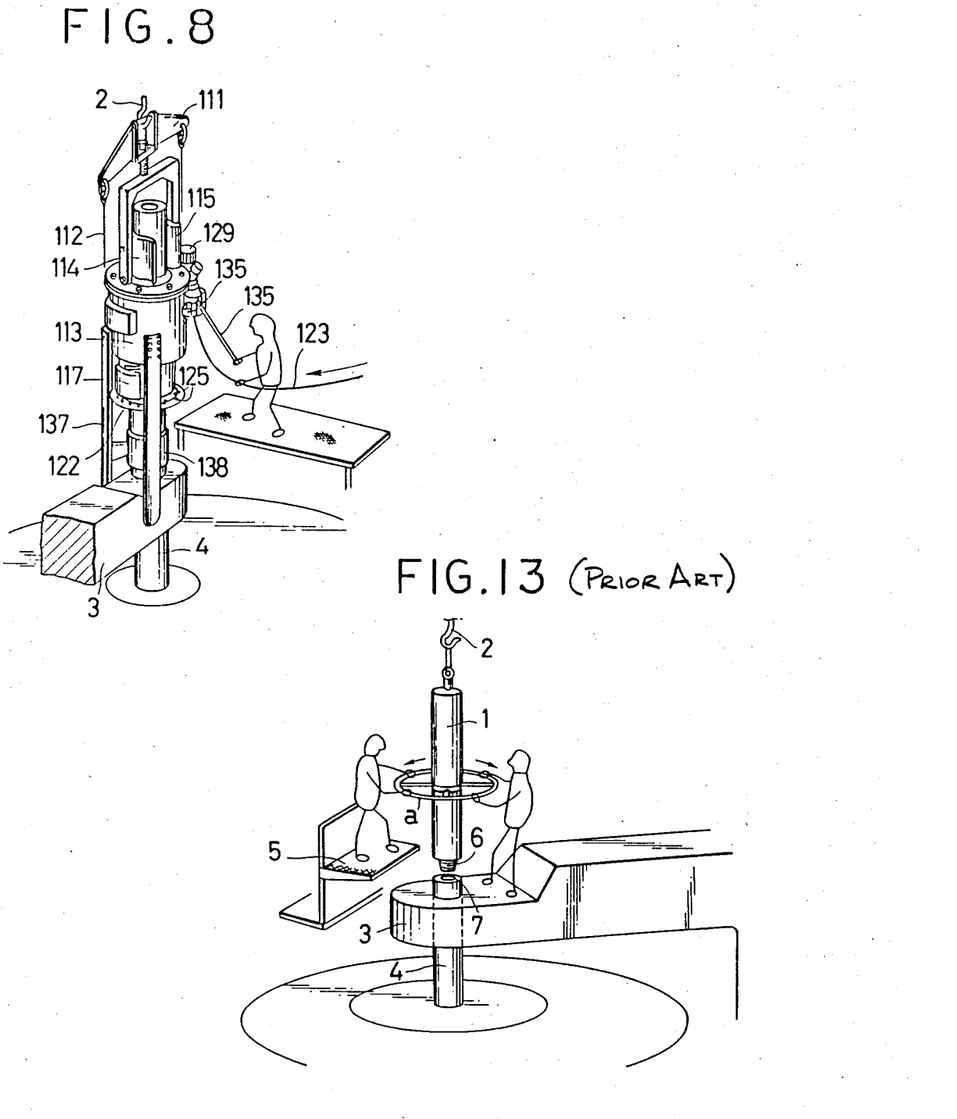
FIG. 8 is a perspective view showing the manner of joining a new electrode to an electrode on an electric furnace by the electrode adding apparatus of FIG. 3.
FIG. 13 is a perspective view showing a prior art conventional manner of adding an electrode.

FIG. 13 of the accompanying drawings illustrates a conventional manner of adding a new electrode to an electrode held by the electrode holder of an electric furnace, in which a new electrode 1 fixedly provided with a handle a for rotating the new electrode 1 is suspended from the hook 2 of a crane. The new electrode 1 is brought above an electrode 4 held by the electrode holder of the electric furnace, and the handle a is rotated as the new electrode 1 is lowered toward the electrode 4 to join the new electrode 1 to the electrode 4. This electrode adding process requires at least two workmen for adjusting the position of the new electrode 1 and rotating the handle a on the electrode holder 3 and/or a working stage 5. As the handle a is rotated, a taper screw 6 formed at the lower end of the new electrode 1 is screwed in an internal thread 7 formed in the upper end of the electrode 4 held by the electrode holder 3 to join the new electrode 1 to the electrode 4. This electrode adding process, however, requires extended, difficult work at an elevated area within a high-temperature dusty environment, which is undesirable with respect to the safety and health of the workmen. Furthermore, since the electrodes are joined together through human effort, the electrodes may swing and break due to unstable junction caused by an insufficient fastening torque.

SUMMARY OF THE INVENTION

The present invention solves the foregoing problems in adding a new electrode to an electrode held by the electrode holder of an electric furnace.

Accordingly, it is an object of the present invention to provide an accessible electrode adding apparatus capable of rapidly and reliably adding a new electrode to an electrode held on an electric furnace, and capable of solving problems adversely affecting the safety and health of the workmen.

In order to achieve the object of the invention, the present invention provides an electrode adding apparatus which screws the lower end of a new electrode in the upper end of an electrode held by the electrode holder of an electric furnace to join the new electrode to the electrode on the electric furnace. The electrode adding apparatus according to the present invention comprises a casing suspended from the hook of a crane, a clamping device for gripping a new electrode which is rotatably disposed within the casing, rotative driving means for rotatively driving the clamping device, and rotative reaction force bearing means provided on the casing to inhibit the idle rotation of the casing by a reaction force that acts on the casing in rotating the electrode gripped by the gripping device.

The above and other objects, features and advantages of the present invention will become more apparent from the following description taken in conjunction with the accompanying drawings.

DESCRIPTION OF THE PREFERRED EMBODIMENTS

Figure 1:
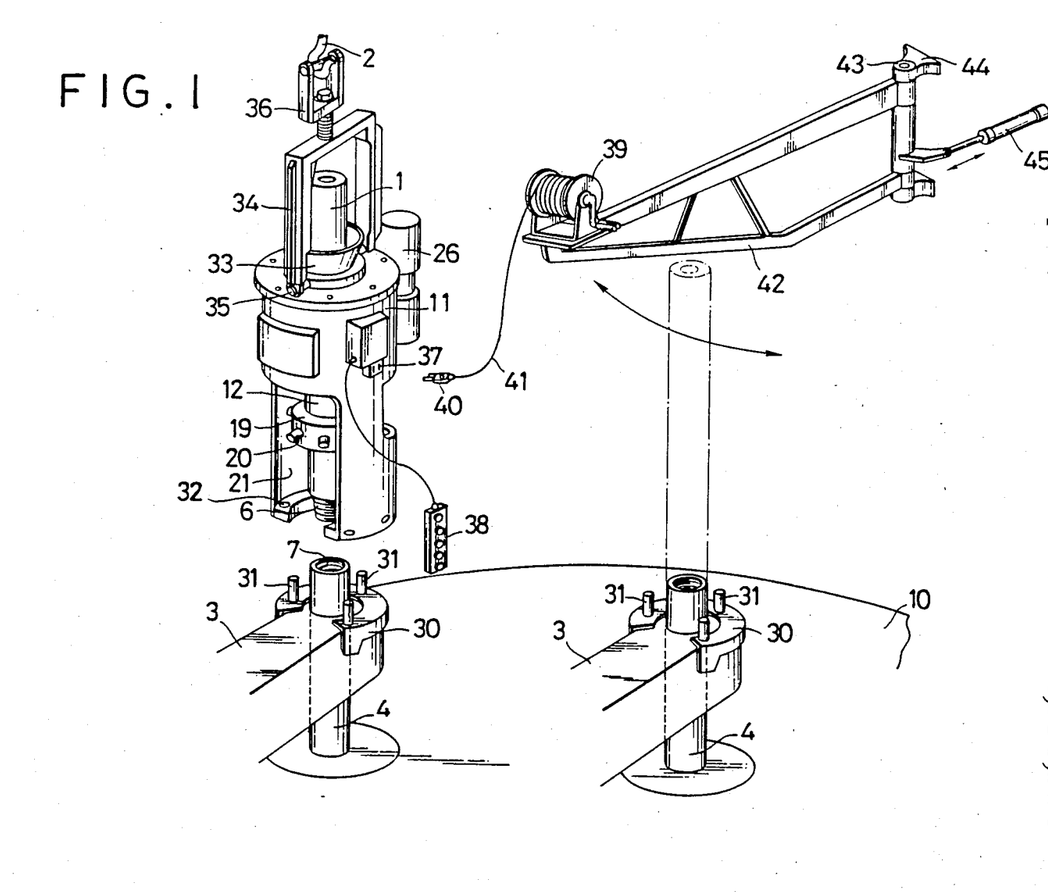
FIG. 1 is a prespective view of an electrode adding apparatus, in a first embodiment, according to the present invention.
Figure 2:
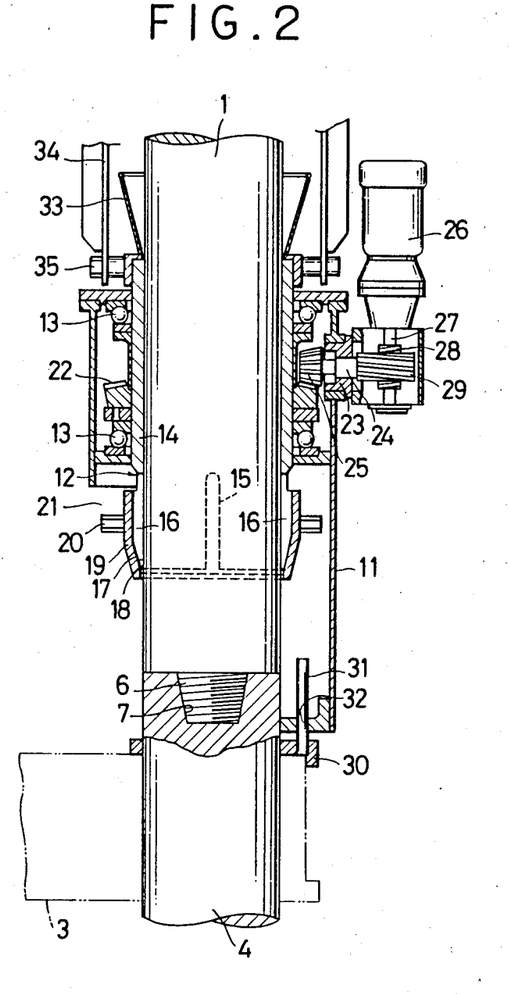
FIG. 2 is a longitudinal sectional view of an essential portion of the electrode adding apparatus of FIG. 1.

Referring to FIG. 1 which shows a first embodiment of the present invention, electrodes 4 are inserted through the top into the interior of an electric furnace 10, and are held at the respective upper ends thereof by electrode holders 3, respectively. The electrode holders 3 are each moved vertically by a lifting device (not shown) and have fastening means employing a pneumatic power cylinder, for gripping the electrode 4 at the upper end thereof so that the depth of insertion of the electrode 4 is adjustable. The electrode adding apparatus according to the present invention has a casing 11, which is suspended from the hook 2 of a crane. As illustrated in FIG. 2, the casing 11 is formed as a hollow construction to receive a new electrode 1 therethrough. A clamping device 12 for clamping the new electrode 1 is rotatably supported in a pair of thrust bearings 13 on the casing 11 at the upper and lower ends thereof. The clamping device 12 has a hollow cylindrical member 14 for receiving the new electrode 1 therein. A plurality of slits 15 are formed in the lower end of the cylindrical member 14 to form a plurality of radially flexible gripping tongues 16. Each gripping tongue 16 has a lower tapered end 17 formed by tapering the outer surface of the same. A fastening ring 19 having a lower tapered end 18 is screwed on the cylindrical member 14 so that the tapered end 18 thereof engages the tapered ends 17 of the gripping tongues 16. Thus, the gripping tongues 16 and the fastening ring 19 constitute a collet chuck.

When the fastening ring 19 is screwed tight on the gripping tongues 16, the gripping tongues 16 grip the new electrode 1. When the fastening ring 19 is loosened, the gripping tongues 16 release the electrode 1. Handles 20 project radially from the circumference of the fastening ring 19. An opening 21 is formed in the casing 11 to make the handles 20 accessible to the operator.

A bevel gear 22 is secured to the circumference of the cylindrical member 14 of the clamping device 12. A bevel gear 25 fixed to one end of a rotary shaft 24 rotatably supported in a bearing 23 on the casing 11 engages the bevel gear 22. A worm wheel 29 fixed to the other end of the rotary shaft 24 engages a worm 28 fixed to the driving shaft 27 of a motor 26 which provides a rotative driving means for driving the clamping device 12. The motor 26 is inverter-controlled for applying a predetermined fastening torque to the clamping device 12.

A reaction force bearing member 30 is secured to the electrode holder 3 to receive a rotative reaction force that is applied to the casing 11 in screwing the lower end of the new electrode 1 into the upper end of the electrode 4 held by the electrode holder 3. The reaction force bearing member 30 has an L-shaped cross section and is C-shaped in plan. The reaction force bearing member 30 is provided with a plurality of pins 31 on the upper surface thereof and fits the upper portion of the free end of the electrode holder 3. Through holes 32 are formed in the lower end of the casing 11 so as to receive the pins 31, respectively. Thus, the pins 31 extend the through holes 32, when the casing 11 is lowered, to sustain the reaction force that is applied to casing 11 when the new electrode 1 is rotated to join the same to the electrode 4.

An electrode guide member 33 is attached to the upper end of the cylindrical member 14 of the clamping device 12. A U-shaped hanging frame 34 is pivotally joined to the upper end of the cylindrical member 14 with a transverse shaft 35. A hanger 36 which is hooked on a hook 2 is connected to the handing frame 34. The hook 2 is rotatable, so that the hanging frame 34 is able to rotate together with the clamping device 12.

A plug socket 37 for receiving power supplied to the motor 26, and a pendant switch unit 38 for controlling the motor 26 are provided on the side wall of the casing 11. A feed cable 41 having a plug 40 to be plugged in the plug socket 37 at the free end thereof is wound on a cable drum 39 mounted on the free end of a swivel arm 42 capable of swiveling in a horizontal plane in the vicinity of the upper end of the electrode 4 projecting from the top of the electric furnace 10. The swivel arm 42 is supported at the base end thereof with a vertical shaft 43 on brackets 44 secured to a neighboring deck or a fixed wall. The swivel arm 42 is driven for swivel motion by a power cylinder 45.

The manner of electrode adding operation of the above constituted electrode adding apparatus will now be described. First, the fastening ring 19 is loosened, then the new electrode 1 is inserted into the clamping device 12 so that the taper screw 6 is directed downward, and then the fastening ring 19 is turned manually to grip the new electrode 1 with the gripping tongues 16.

Then, the crane is operated to bring the casing 11 holding the electrode 1 above the electrode holder 3, and following which the casing 11 is lowered toward the electrode holder 3 so that the pins 31 of the reaction force bearing member 30 engage the through holes 32 of the casing 11, respectively, and the free end of the taper screw 6 of the electrode 1 is placed in abutment with the upper end of the internal thread 7 of the electrode 4 held by the electrode holder 3. Then, the motor 26 is actuated to rotate the electrode 1 through the worm 28, the worm wheel 29, the bevel gears 25 and 22 and the clamping device 12. Consequently, the taper screw 6 of the electrode 1 engages the internal thread 7 of the electrode 4, so that the electrodes 1 and 4 are joined together. After the new electrode 1 has thus been added to the electrode 4, the fastening ring 19 is loosened, the casing 11 is then lifted up by the crane to separate the electrode adding apparatus from the electrode 1, and then the electrode adding apparatus is prepared for the next electrode adding operation.

The electrode 1 is rotated rapidly at a predetermined torque by the motor 26 to join the same firmly to the electrode 4 held by the electrode holder 3. Accordingly, the addition of the new electrode 1 to the electrode 4 can be carried out safely and rapidly by only a single operator and hence the operator's safety maintained even though the operator is working at a dusty elevated area in a high-temperature environment. Since the electrodes 1 and 4 are joined reliably and firmly, the electrode will never fall off. Furthermore, since the clamping device is of the collet type, the clamping device 12 has a simple construction, is lightweight and can be manufactured at a low cost. Still further, the swivel arm 42 and the cable drum 39 expand the operating range of the electrode adding apparatus. Furthermore, the reaction force bearing member 30 inhibits the accidental rotation of the casing 11 and hence the torque of the clamping device 12 can be effectively transmitted to the electrode 1. The reaction force bearing member 30 may be detachable.

An electrode adding apparatus, in a second embodiment, according to the present invention will now be described with reference to FIGS. 3 to 6.

Figure 3:
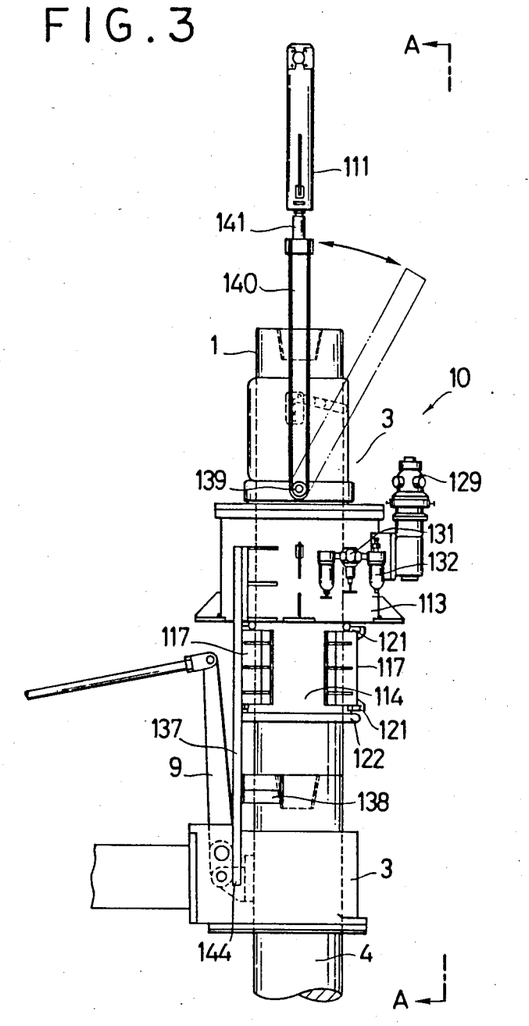
FIG. 3 is a side elevational view of an electrode adding apparatus, in a second embodiment, according to the present invention.
Figure 4:
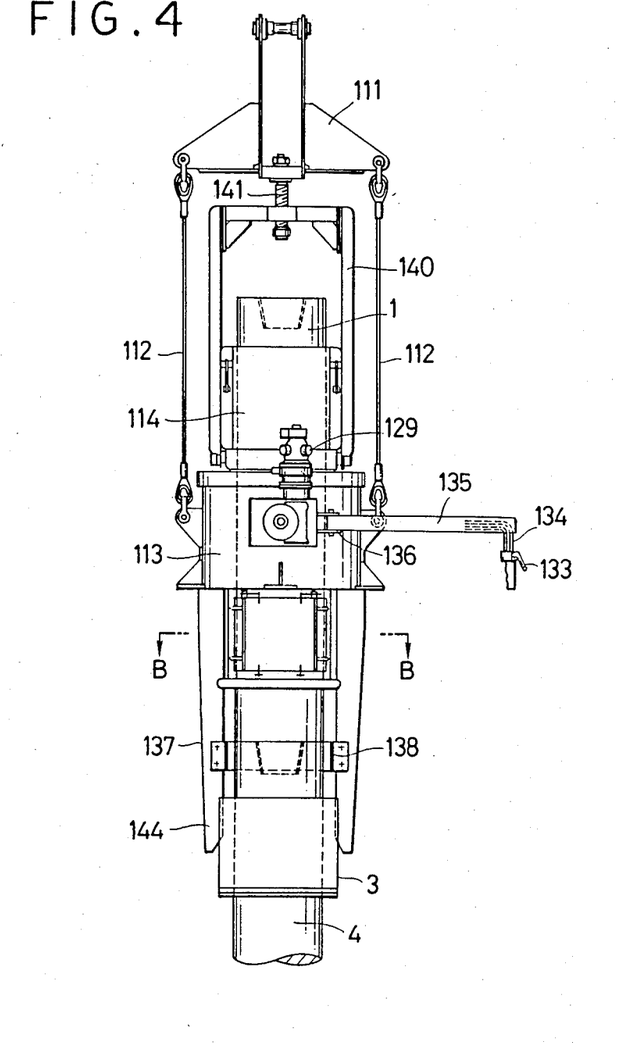
FIG. 4 is a view taken along the line A—A in FIG. 3.

Referring to FIG. 3, indicated at 3 is an electrode holder disposed above an electric furnace. The electrode holder 3 has a bore 8 for vertically receiving an electrode 4 therethrough, and a lever 9 for operating gripping means which detachably grips, together with the inner circumference of the bore 8, the electrode 4. In FIG. 3, indicated generally at 10 is the electrode adding apparatus.

Figure 5:
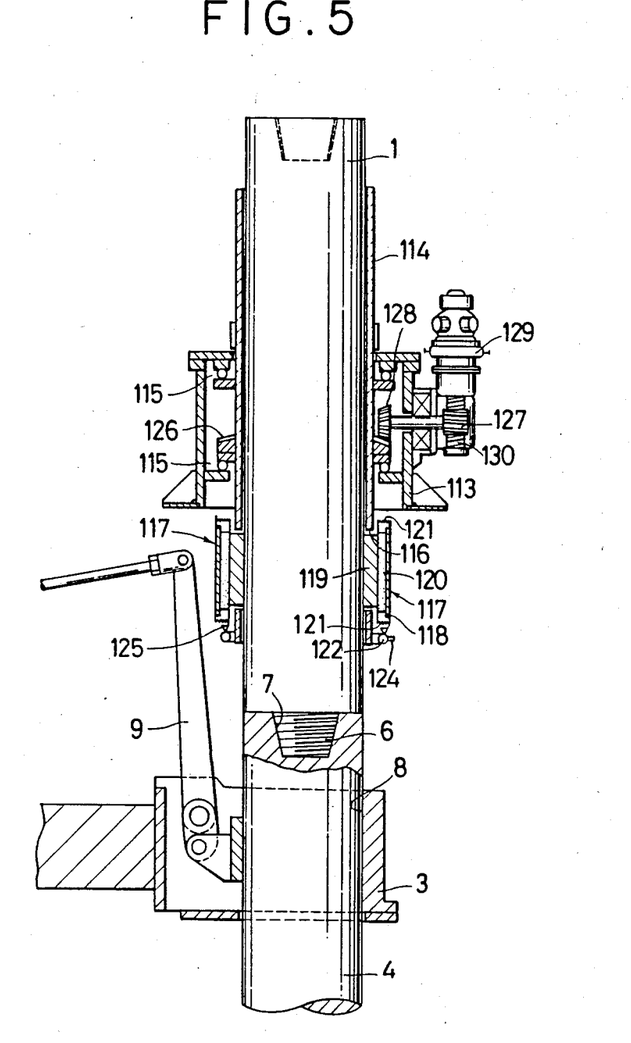
FIG. 5 is a sectional view of an essential portion of the electrode adding apparatus of FIG. 3.
Figure 6:
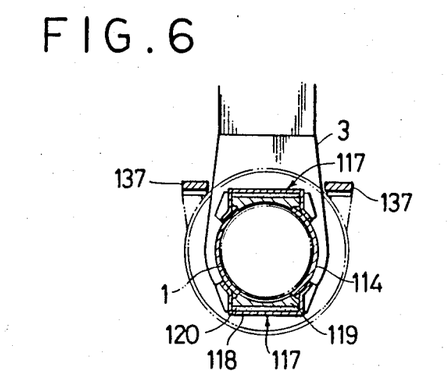
FIG. 6 is a sectional view taken along line B—B in FIG. 4.
Figure 7:
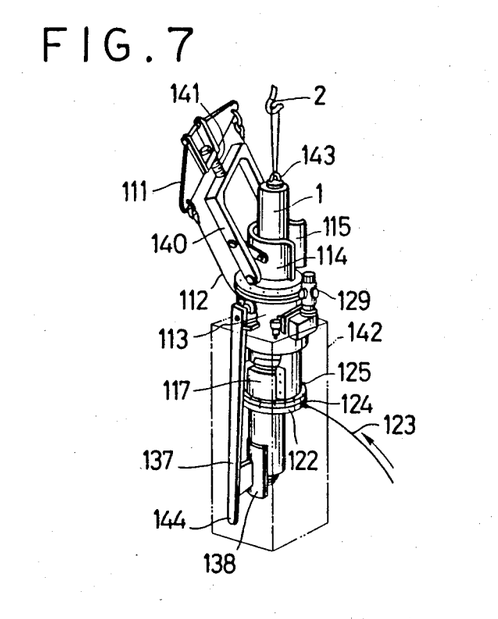
FIG. 7 is a perspective view showing the manner of inserting an electrode into the electrode adding apparatus of FIG. 3.

The electrode adding apparatus 10 has a hollow cylindrical casing 113, which is suspended from the hook 2 of a crane by means of a hanger 111 and slings 112. A sleeve 114 for receiving a new electrode 1 therethrough is disposed with the casing 113 and is rotatably supported on thrust bearings 115. As illustrated in FIGS. 7 and 8, the side wall of the upper end of the sleeve 114 is cut to form an entrance 115 to facilitate the reception of a new electrode 1. A pair of openings 116 for receiving air chucks 117 therein are formed diametrically in the lower end of the sleeve 114. As illustrated in FIGS. 5 and 6, the air chucks for gripping the electrode 1 are radially movable in the openings 116 and are covered with covers 118, respectively. Each air chuck 117 comprises, as the principal components, a chucking member 119 and a pneumatic bag 120 disposed between the chucking member 119 and the cover 118. In gripping the electrode 1, air is blown into the pneumatic bag 120 to press the chucking member 119 against the side surface of the electrode 1. Return springs 121 are provided between the chucking member 119 and the cover 118 to move the chucking member 119 away from the electrode 1 when the pneumatic bags 120 is discharged. An annular air supply pipe 122 is attached to the lower end of the sleeve 114. A mouthpiece 124 including a quick coupler for detachably connecting an air hose connected to an air source to the air supply pipe 122, and a shut valve is attached to the air supply pipe 122. The pneumatic bags 120 are connected to the air supply pipe 122 with tubes, not shown, respectively. The air supply pipe 122 is provided with a plurality of valves 125 to discharge air in optional directions.

The sleeve 114 is rotated through a gear train by a pneumatic motor 120 to rotate the electrode 1 through the air chucks 117. The gear train comprises an annular bevel gear 126 secured to the sleeve 114, a bevel gear 128 engaging the annular bevel gear 126, a worm wheel 127 formed integrally with the bevel gear 128, and a worm 130 engaging the worm wheel 128 fixed to the driving shaft of the pneumatic motor 129. The pneumatic motor 129 is mounted on the casing 113. The pneumatic motor 129 is connected to a pressure regulating valve 132 provided with a mouthpiece 124 including a quick coupler for detachable connecting the mouthpiece 124 to an air hose 123, and a shut valve. A pendant valve unit 133 for controlling the pneumatic motor 129 is connected to the pneumatic motor 129. Tubes 134 extending from the pendant valve unit 133 are held by an arm 135 pivotally joined by a hinge 136 to the casing 113.

Legs 144 forming a rotative reaction force bearing means 137 for inhibiting the rotation of the casing 113 by the rotative reaction force of the sleeve 114 extend downwardly from the casing 113. Centering guides 138 each having a curvilinear surface, to be applied to the side surface of the electrode 4 held by the electrode holder 3 for aligning the new electrode 1 with the electrode 4 are attached to the legs 144, respectively.

An inverted U-shaped hanging frame 140 is joined pivotally by pins 139 to the upper end of the sleeve 114. A bolt 141 having a thread of the same pitch as that of the taper screw 6 of the electrode 1 and depending from a hanger 111 is screwed in the hanging frame 140 to suspend the electrode adding apparatus 110 so that the electrode adding apparatus 110 is moved downward along with the downward movement of the electrode 1 as the tapered screws 6 of the electrode 1 is screwed in the electrode 4. After the new electrode 1 has been joined to the electrode 4 held on the electric furnace, the hanging frame 140 is rotated in the reverse direction to restore the hanging frame 140 to its original position relative to the hanger 111. Slings 112 are provided only for safety's sake in case the bolt 141 falls off or breaks, and hence the slings 113 need not necessarily be provided.

In adding the new electrode 1 to the electrode 4 held on the electric furnace by means of the electrode adding apparatus 110 as described above, first, the casing 113 is held by a holder 142 placed on the ground, and then the air hose 123 is connected to the mouthpiece 124 of the air supply pipe 122 as illustrated in FIG. 7. Then, the new electrode 1 suspended from the hook 2 of a crane with a sling having a swivel 143 is inserted into the sleeve 114 and is held at a predetermined position relative to the sleeve 114, and then the shut valve of the mouthpiece 124 is opened to actuate the chucks 117 to chuck the electrode 1. After the electrode 1 has firmly been chucked, the shut valve is closed. Then, the air hose 123 is disconnected from the mouthpiece 124 and the swivel 143 is separated from the electrode 1. Then, the hanger 111 is hooked on the hook 2 of the crane, the casing 113 is moved to a position above the electric furnace, the air hose 123 is connected to the mouthpiece 124 of the pressure regulating valve 132, and the pressure regulating valve 132 is set at a predetermined air pressure to apply a predetermined fastening torque to the electrode 1.

Then, the casing 113 is lowered by the crane so that the legs 144 engage the electrode holder 3 and the centering guides 138 engage the side surface of the electrode 4 held by the electrode holder 3 to align the electrode 1 with the electrode 4. Then, the pendant valve unit 133 is operated to actuate the pneumatic motor 129 so that the electrode 1 is rotated in the normal direction. Consequently, the tapered screw 6 of the electrode 1 is screwed into the upper end of the electrode 4 and the electrode 1 is thereby firmly joined to the electrode 4. As the new electrode 1 is rotated, the hanging frame 140 rotates on the bolt 141 depending from the hanger 111, so that the electrode adding apparatus 110 moves downward at the same rate as the new electrode 1. Accordingly, the crane need not be operated while the new electrode 1 is screwed into the electrode 4.

After the new electrode 1 has thus been joined to the electrode 4, the pneumatic motor 129 is stopped, the valve 125 of the air supply pipe 122 is opened to open the chucks 117, the air hose 123 is disconnected from the mouthpiece 124, and then the casing 113 is moved away from the electric furnace to a position on the ground.

Since the electrode 1 is gripped and rotated pneumatically, the air supplied to the equipment of the electric furnace can also be used for operating the electrode adding apparatus 110 and hence any special equipment is not necessary, which is advantageous over an electrically driven electrode adding apparatus. Furthermore, the air chucks 117 are able to grip the new electrode 1 quickly and the pneumatic motor 129 rotates the new electrode 1 smoothly. Accordingly, the electrode adding work can be carried out safely and rapidly and hence the operator need not remain in a dangerous environment for an extend period, which is advantageous from the view point of operator's safety. Since pneumatic driving requires small devices for larger output, the electrode adding apparatus comprises a compact, lightweight construction at low cost.

Figure 9:
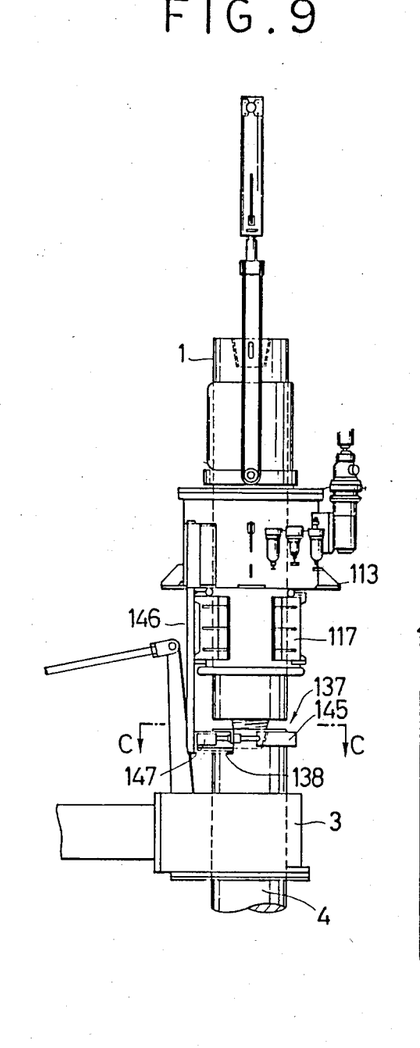
FIG. 9 is a side elevational view showing a modification of the present invention.
Figure 10:
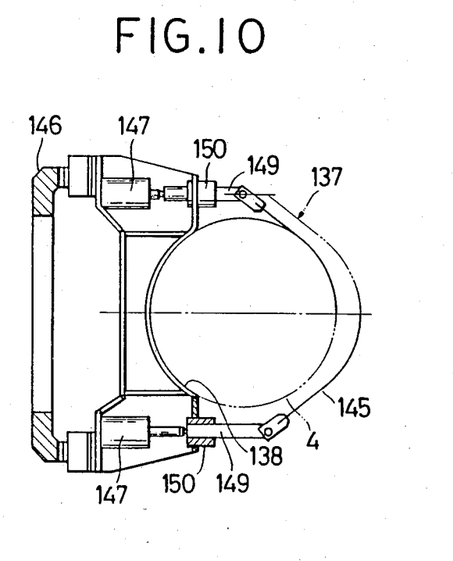
FIG. 10 is an enlarged view taken along the line C—C in FIG. 9.

FIGS. 9 and 10 illustrates a modification of the second embodiment, in which a combination of a centering guide 138 and a fastening belt 145 is provided for aligning the new electrode with the electrode 4 held on the electric furnace. The centering guide 138 and the fastening belt 145 clamp the electrode 4 held by the electrode holder 3 to ensure the further reliable centering of the new electrode 1. Furthermore, since the centering guide 138 and the fastening belt 145 engage the electrode 4 fixedly to receive the rotative reaction force of the casing 113, the legs 144 of the second embodiment are not necessary.

In this embodiment, the centering guide 138 is held by a holding frame 146 instead of the legs 144 as illustrated in FIGS. 9 and 10. A pair of power cylinders 147 are attached to the opposite ends of the centering guide 138, and the opposite ends of the fastening belt 145 are connected through guide rods 149 to the respective free ends of the piston rods 148 of the power cylinders 147, respectively. The guide rods 149 are slidably fitted in guide sleeves 150 attached to the opposite ends of the centering guide 138, respectively.

Figure 11:
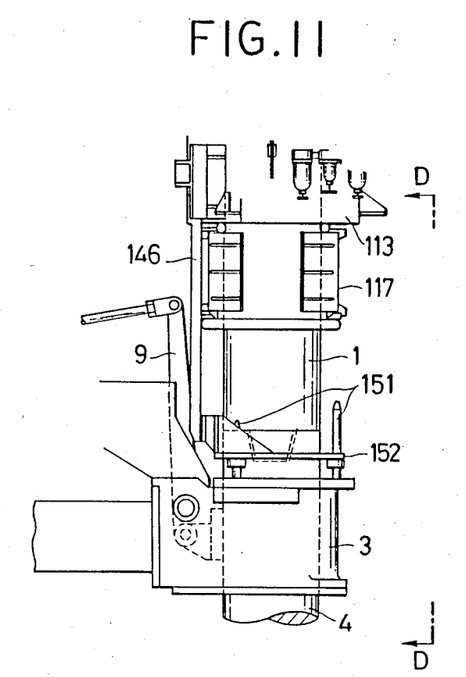
FIG. 11 is a side elevational view of another modification of the present invention.
Figure 12:
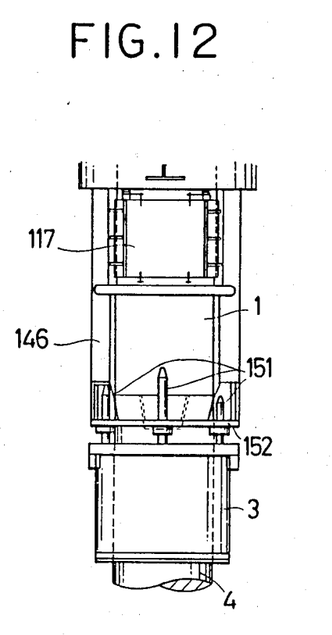
FIG. 12 is a view taken along the line D—D in FIG. 11.

FIGS. 11 and 12 illustrate another modification of the second embodiment, in which three upright pins 151 and a frame 152 having three holes for receiving the pins 151 are provided instead of the rotative reaction force bearing means 137 and the centering guides 138. The pins 151 are fixed upright to the upper surface of the electrode holder 3 around the opening of the same at angular intervals. The free ends of the pins 151 are tapered to facilitate the entrance thereof into the corresponding holes of the frame 152. The pins 151 are different from each other in height. The frame 152 is formed in an annular shape so that the electrodes 1 and 4 can be received therethrough, and is held below the casing 113 by a holding frame 146.

Although the invention has been described in its preferred forms with a certain degree of particularity, it is to be understood that many variations and changes are possible in the invention without departing from the scope thereof.

What is claimed is:

1. An electrode adding apparatus for connecting a first electrode provided with an external thread at its bottom to a second electrode provided with an internal thread at its top by screwing the first electrode into the second electrode, the second electrode protruding from an electric furnace and being held by an electrode holder, comprising:

a hollow cylindrical member for rceiving the first electrode therethrough;

a clamping device for holding the first electrode, said clamping device being integral with the hollow cylindrical member;

a hanger adapted to be hooked on a hook of a crane;

a bolt provided with the hanger and being screwed into a hanging frame in order to suspend the hollow cylindrical member so that as the hollow cylindrical member rotates, the hollow cylindrical member moves downward at the same rate as the external thread of the first electrode;

a casing for supporting the hollow cylindrical member rotatably about the longitudinal axis of the cylindrical member;

motor means including bevel gears for rotating the hollow cylindrical member, said motor being mounted on the casing; and casing guide means for matching the center line of the second electrode held by the electrode holder with that of the first electrode, for limiting the rotation of the casing, and for guiding the casing to a position above the electrode holder.

2. An electrode adding apparatus as recited in claim 1, wherein said casing guide means comprises:

a plurality of pins protruding from said electrode holder around the second electrode; and a plurality of holes formed in said casing for receiving said plurality of pins.

3. An electrode adding apparatus as recited in claim 1, wherein said casing guide means comprises:

two legs for engaging the casing with the electrode holder, and attached to the casing; and a centering guide for aligning the first electrode with the second electrode by fitting the first electrode on the surface of the second electrode held by the electrode holder.

* * * * *